United States Patent
Kang et al.

(10) Patent No.: US 10,140,458 B2
(45) Date of Patent: Nov. 27, 2018

(54) PARALLELIZED AUTHENTICATION ENCODING

(71) Applicant: Intel Corporation, Santa Clara, CA (US)

(72) Inventors: Chang Yong Kang, Chandler, AZ (US); Pierre Laurent, Kilnacrandy (IE)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 15/093,200

(22) Filed: Apr. 7, 2016

(65) Prior Publication Data

US 2017/0293765 A1   Oct. 12, 2017

(51) Int. Cl.
  *G06F 12/14*  (2006.01)
  *G06F 21/60*  (2013.01)
  *G06F 9/30*   (2018.01)
  *G06F 9/38*   (2018.01)
  *G06F 21/64*  (2013.01)

(52) U.S. Cl.
  CPC ........ *G06F 21/602* (2013.01); *G06F 9/30007* (2013.01); *G06F 9/30101* (2013.01); *G06F 9/3867* (2013.01); *G06F 21/64* (2013.01)

(58) Field of Classification Search
  None
  See application file for complete search history.

(56) References Cited

U.S. PATENT DOCUMENTS

| | | | |
|---|---|---|---|
| 7,027,597 B1* | 4/2006 | Stojancic | ............... G06F 7/728 380/28 |
| 2002/0071552 A1 | 6/2002 | Rogaway | |
| 2006/0245588 A1 | 11/2006 | Hatakeyama | |
| 2008/0104397 A1 | 5/2008 | Paddon et al. | |
| 2012/0179912 A1 | 7/2012 | Sandberg et al. | |
| 2013/0145169 A1 | 6/2013 | Poovendran et al. | |

OTHER PUBLICATIONS

Y. Nir, "RFC7539—ChaCha20 and Poly1305 for IETF Protocols", Google, Inc., May 2015, 90 pages.
International Search Report for PCT Application No. PCT/2017/020982 dated Jun. 9, 2017, 12 pages.

* cited by examiner

*Primary Examiner* — Brandon S Hoffman
(74) *Attorney, Agent, or Firm* — Lowenstein Sandler LLP

(57) ABSTRACT

A processing system implementing techniques for parallelized authentication encoding is provided. In one embodiment, the processing system includes an accumulator, a register representing a pipeline stage and a processing core coupled to the accumulator and to the register. The processing core is to split an input message into a first input stream and a second input stream. For each input stream, the processing core is further to add, to the accumulator, a data block from the input stream. Contents of the accumulator multiplied by a squared nonce value are stored in the register and a result of applying a modulo reduction operation to the contents of the register is stored in the accumulator. Thereupon, an authentication tag for the input message is generated based on the result stored in the accumulator and the contents of the register.

20 Claims, 13 Drawing Sheets

US 10,140,458 B2

PARALLELIZED AUTHENTICATION ENCODING

TECHNICAL FIELD

Embodiments of the disclosure relate generally to microprocessors and more specifically, but without limitation, to parallelized authentication encoding.

BACKGROUND

In cryptography, a message authentication code (MAC) is often used to provide integrity and authenticity assurances on a transmitted message. In many systems, the MAC is often produced by using a "hash function" that accepts as input a secret key and an arbitrary-length message to be authenticated, and outputs the MAC (also known as a tag). The MAC value protects both data integrity of the message as well as its authenticity, by allowing verifiers to detect any changes to the message content.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
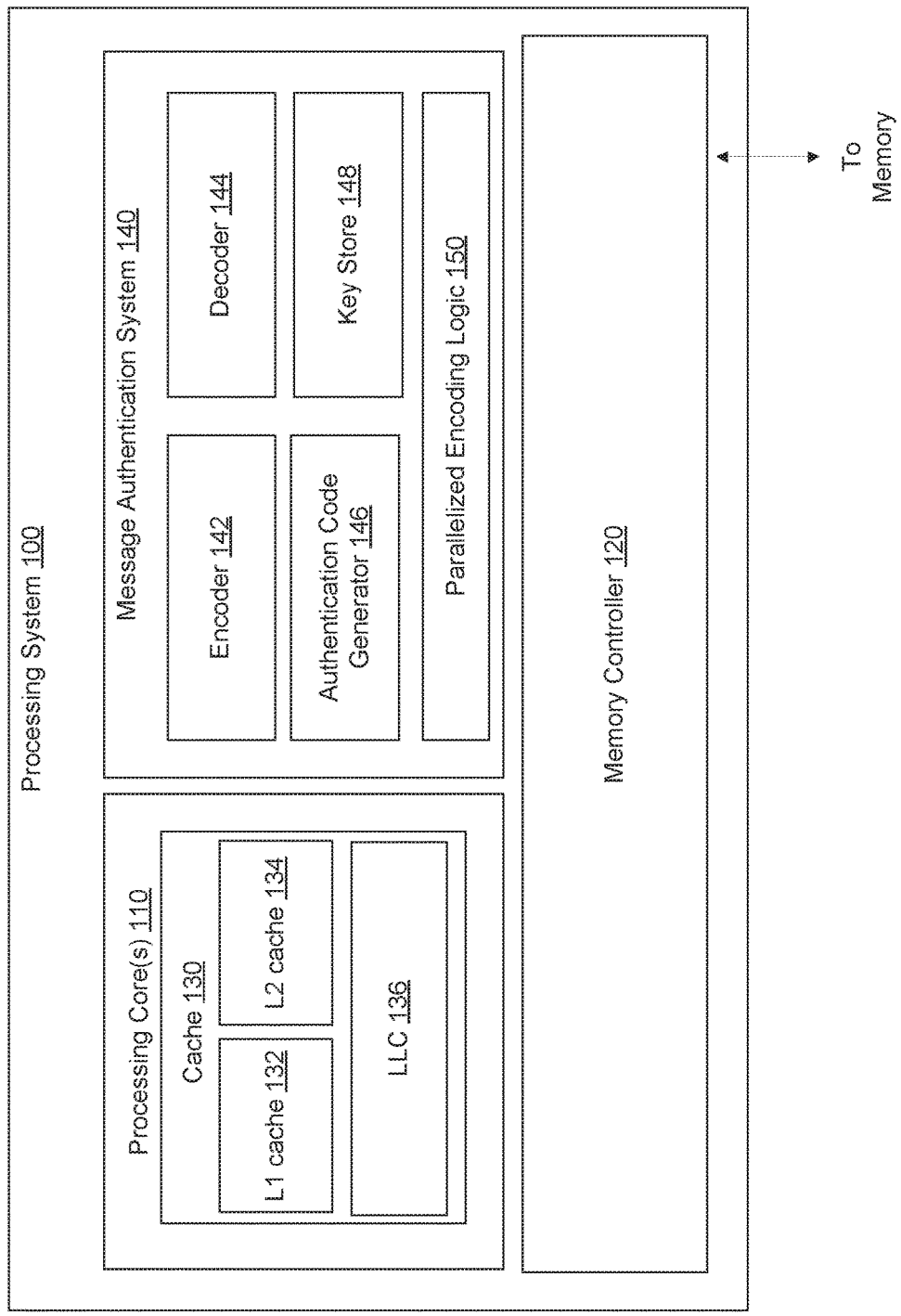
FIG. 1 illustrates a block diagram of a processing system for supporting parallelized authentication encoding according to one embodiment.

Techniques for parallelized authentication encoding are disclosed herein. An authentication system may employ various hardware and software elements, cryptographic keys, algorithms, and/or techniques to protect the confidentiality and authenticity of encoded communications. More specifically, authentication encoding attempts to make it infeasible for a party to fraudulently represent themselves as an authentic message source. This is accomplished, for example, by combining the message with an authentication code, such as a Message Authentication Code (MAC), "authentication tag" or "tag." The authentication tag may be generated for a variable-length message based on a cryptographic computation, such as Poly 1305-AES (Advanced Encryption Standard) hashing algorithm, which computes (using a secret key) a value to use an as a message authenticator. The shared key is shared by a message sender and receiver and includes two parts, a first portion comprising a 16-byte nonce value (e.g., a message identifier that is different for each message) and a second portion comprising a key value. The key value is combined with the results of the cryptographic hashing algorithm to generate an identification string of a certain length (e.g., 128 bits) for the authentication tag.

In operation, the cryptographic hashing algorithm may include two parts: a multiplication part and a modular reduction part. To implement the cryptographic computation, an authentication system initially breaks a message into 16-byte blocks. Each block is then added into a hardware accumulator (such as a register that can store a plurality of bits of a large integer value), and gets multiplied by a nonce value of the shared key. The results of the multiplication are combined with a modulus value, such as a determined prime number (e.g., $2^{130}-5$) that is used to reduce the results to a certain length. The operation repeats for all of the 16-byte blocks in the message, and then the key portion of the secret key is added to produce a final tag for the message. In some situations, the processing of one of the 16-byte blocks of a particular message can be completed in a single clock cycle. In this regard, the clock frequency at which the authentication system can operate depends on the length of time to complete the slowest step in the cryptographic computation.

To improve the clock frequency of the authentication system, a pipeline stage can be inserted between processing steps of the cryptographic computation. The pipeline stage can be a hardware device (e.g., a register) that stores partial results produced by a preceding functional step being executed in a pipelined fashion. Once the partial results are stored in the pipeline stage, the preceding functional step is freed to being processing another set of data in the pipeline. One option for inserting the pipeline stage is between the multiplication part and modular reduction part of the cryptographic computation. For example, the pipeline stage can be used to store a combination of the results of the multiplication part of the algorithm for processing in the later modular reduction part. The frequency of the authentication system, however, may be only minimally improved due to the data dependency between consecutive rounds. For example, the processing of a 16-byte block cannot begin or may otherwise remain idle until the processing of the previous block is complete, thus leading to a sequential activation of the multiplication and modular reduction parts of the cryptographic computation, rather than an overlapping activation in time.

Embodiments of the disclosure provide techniques to improve the hardware utilization efficiency in a pipeline construction of a cryptographic computation implemented by an authentication system. In accordance with one embodiment of the disclosure, two different messages are processed at least partially overlapping in time to generate an authentication tag for each of the different messages. For example, the authentication system may utilize a switching device (e.g., a multiplexer) coupled to pipeline hardware to switch between the two message streams at every clock cycle during each operation in the cryptographic computation. Thus, the two message streams are at least partially processed in overlapping time to make the pipeline hardware appear as if there were two independent authentication processors working simultaneously.

In accordance with another embodiment of the disclosure, a text data stream associated with a single input message is split into two text data streams, such as a first text data stream and a second text data stream. For example, the text will be inputted into the pipeline hardware in an alternating fashion between certain blocks of the two streams. The split text data streams are processed in parallel using the pipeline hardware, overlapping in time, to generate an authentication tag for the single input message. In this situation, the pipeline hardware is utilized to create two independent streams out of the single input message stream in order to double the processing throughput of the cryptographic computation used to create an authentication tag. To accomplish this, the multiplication part of cryptographic hashing algorithm becomes a multiplication by a squared nonce value. Thereafter, the results from the two streams are merged together and a key value is added to generate the authentication tag for the original message stream.

Still further, other variations of the techniques disclosure herein can be implemented for parallelized authentication encoding to increase the clock frequency of the authentication system.

FIG. 1 illustrates a block diagram of a processing system 100 to support parallelized authentication encoding according to one embodiment. The processing system 100 may be generally referred to as "processor" or "CPU". "Processor" or "CPU" herein shall refer to a processing device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing system 100 may include various components. In one embodiment, processing system 100 may include one or more processors cores 110 and a memory controller unit 120, among other components, coupled to each other as shown. The processing system 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing system 100 may be used in a system on a chip (SoC) system. In one embodiment, the SoC may comprise processing system 100 and a memory. The memory for one such system is a DRAM memory. The DRAM memory can be located on the same chip as the processor and other system components. Additionally, other logic blocks such as a memory controller or graphics controller can also be located on the chip.

Memory controller 120 may perform functions that enable the processing system 100 to access and communicate with memory (not shown) that includes a volatile memory and/or a non-volatile memory. In some embodiments, the memory controller 120 may be located on a processor die associated with processing system 100, while the memory is located off the processor die. In some embodiments, the processing system 100 includes a cache unit 130 to cache instructions and/or data. The cache unit 130 includes, but is not limited to, a level one (L1) 132, level two (L2) 134, and a last level cache (LLC) 136, or any other configuration of the cache memory within the processing system 100. In some embodiments, the L1 cache 132 and L2 cache 134 can transfer data to and from the LLC 136. In one embodiment, the memory controller 120 can be connected to the LLC 136 to transfer data between the cache unit 130 and memory. As shown, the cache unit 130 can be integrated into the processing cores 110. The cache unit 130 may store data (e.g., including instructions) that are utilized by one or more components of the processing system 100.

In some embodiments, the processing system 100 may support message authentication, for example, via a message authentication system 140 or with other components that may be internal or external to the processing core 110. In one embodiment, the message authentication system 140 may comprise hardware (e.g., circuitry, dedicated logic, programmable logic, microcode, etc.), software (such as instructions run on a processing device), or a combination thereof. The message authentication system 140 encrypts and decrypts messages and generates for the authentication encoding tags or MACs for the messages to ensure their authenticity. In some embodiments, the message authentication system 140 may include an encoder 142 to encrypt data, a decoder 144 to decrypt the data, an authentication code generator 146 to generate an authentication encoding tag, a key store 148 as well as other components. The key store 148 stores a secret key used by the authentication code generator 146 to generate the authentication encoding tag.

In operation, the message authentication system 140 receives a message and returns an encrypted message with an accompanying authentication encoding tag for transmission. In other embodiments, the message authentication system 140 is passed an encrypted message and an authentication encoding tag, and return an indication as to whether the message is authenticated based on the authentication encoding tag. If the message is authenticated, the message authentication system 140 then decrypts the message with the decoder 144 and returns the decrypted message.

In some embodiments, the authentication code generator 146 may implement a cryptographic computation, such as Poly 1305-AES hashing algorithm, to generate the authentication encoding tag for a message. In one embodiment, the cryptographic computation may combine the message with a nonce value and a key value representing 128-bit integer that are both derived from a shared key in the key store 148 to produce an authentication encoding tag for the message. In one embodiment, the message authentication system 140 may utilize parallelized encoding logic 150 so that the cryptographic computation can fully utilize hardware of the message authentication system 140. Embodiments described herein may be implemented as a set of instructions in the parallelized encoding logic 150. In some embodiments, the processor cores 110 of the processing device 100 may execute the instructions of the parallelized encoding logic 150 to generate authentication encoding tags for encrypted messages.

Figure 2:
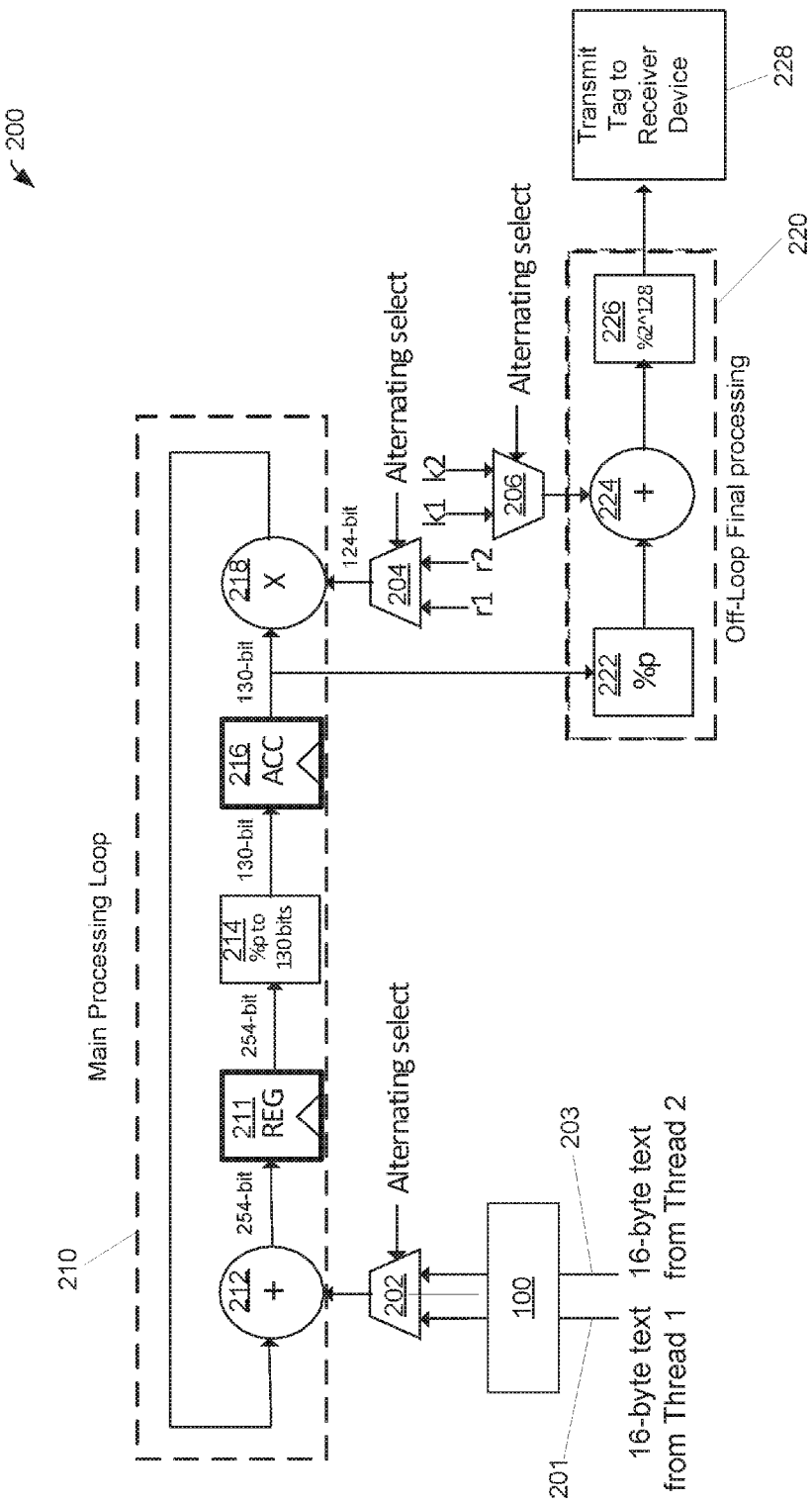
FIG. 2 illustrates a circuit to support parallelized authentication encoding with the processing system of FIG. 1 according to an embodiment of the disclosure.

FIG. 2 illustrates a circuit 200 to support parallelized authentication encoding with the processing system 100 of FIG. 1 according to an embodiment of the disclosure. Circuit 200 can operate as described in connection with the message authentication system 140 and can generate authentication encoding tags for the messages transmitted by processing system 100 to ensure the authenticity of the messages. Advantageously, the circuit 200 provides a highly efficient double-threaded implementation of the parallelized encoding logic 150 which can rapidly obtain results for the authentication encoding tags in manner to fully utilize the hardware components disposed therein.

In one embodiment, the circuit 200 includes several hardware components that include several switching devices, such as a first multiplexer 202, a second multiplexer 204 and a third multiplexer 206, a main processing loop 210 comprising a pipeline stage 211 (e.g., a register) coupled to a first adder 212, an accumulator 216 and a multiplier 218, and a final processing stage 220 that in one implementation includes a second adder 224. The circuit 200 can process two execution treads 201 and 203 of the processing system 100. In this regard, the first of the execution treads (e.g., execution tread 201) accesses a first input text data stream associated with a first message and the second of the execution treads (e.g., execution tread 203) accesses a second input text data stream associated with a second message. The circuit 200 is designed to process the two input text data streams at least partially overlapping in time to generate an authentication tag for each of the messages associated with the different streams.

In some embodiments, the circuit 200 is designed to target a total throughput of 25 Gps in an operational frequency in approximately the 800 MHz range, which may be able to process 16-bytes of text data at every 4 clock cycles. To that end, the multiplier 218 of circuit 200 may comprise a 4 cycle multiplier in which a 65-bit×62-bit multiplier is used for four cycles to realize a 130-bit×124-bit multiplication result. In addition, the first and second adders 212 and 224 may each comprise a 130-bit adder used for the processing loop 210 and the final processing dataflow 220. It should be appreciated that other designs for the circuit 200 can be made for different area-performance tradeoffs. For example, the parallelized encoding logic 150 can be adjusted to support a 3-cycle multiplier to obtain a certain percentage (e.g., approximately 25%) boost in throughput relative to 4 cycles.

In operation, the circuit 200 is designed to so that a first execution thread associated with a first text stream and a second execution thread associated with a second text stream may be executed in parallel to each other a pipelined fashion. In this regard, the two execution threads are synchronized by means of the common hardware associate with the circuit 200. While a first authentication tag for the first text stream is processed, a second authentication tag for the second text stream is started before the first authentication tag is complete. In this regard, when text data from one thread is being processed at a certain stage in the circuit 200, the other execution thread may be processing its own text data at a different stage in the circuit 200, such as at the addition operation of the first adder 212. The switching between operations of the circuit 200 may continue until the message stream associated with each execution thread is completely processed.

In some embodiments, the processing system 100 may retrieve text data from two different execution threads 201 and 203 associated with the system. Each execution thread accesses text data from a corresponding input text stream associated. In some embodiments, the processing system 100 may use the first multiplexer 202 to switch, in alternating sequence, from one of the execution threads 201 and 203 to the other execution thread at a certain frequency (e.g., every n clock cycles). For example, the processing system 100 using the first multiplexer 202 retrieves one 16-byte data block from the first thread and starts processing it in the main processing loop 210. The processing system 100 then retrieves another 16-byte data block from the second thread and starts processing that one in the main processing loop 210. By this time, the main processing loop 210 has moved forward thus freeing up hardware needed for starting the processing of the second data block. For example, output of the first adder 212 sent to pipeline stage 211 in one clock cycle. By storing the results in the pipeline stage 211, the first adder 212 is freed up to begin processing of the other execution thread.

In one embodiment, for each execution thread, the text portion from a respective text stream associated with that execution thread is stored in the accumulator 216. Contents of the accumulator 216 are multiplied by nonce value (e.g., r1 or r2) at multiplier 218. A result of multiplication operation is then stored in pipeline stage 211. In some embodiments, the main processing loop 210 is designed to keep the results of each iteration loop to a certain length (e.g., 130 bits) by applying a modulo reduction operation 214 to the contents of the pipeline stage 211 using a modulus value, such as prime number. The results of the modulo reduction operation are then sent back to the accumulator 216.

In some embodiments, the processing system 100 may use the second multiplexer 204 of the circuit 200 to select, in alternating sequence, a first nonce value r1 to associate with data in one execution thread, such as thread 201, or a second nonce value r2 to associate with data in the other execution thread, such as thread 202. The nonce values are derived from the shared key, which is, for example, stored in the key store 148 associated with processing system 100. As noted, the shared key is shared between the receiver and sender of a transmission mission in accordance with the disclosure and the nonce value comprises a 16-byte message identifier that is different for each message.

The processing system 100 repeats the operations of the main processing loop 210 until all of the 16-byte text data blocks in a message associated with a particular execution thread are processed. In some embodiment, a source of the text data blocks may include an indicator to specify the last block to the text for the particular execution thread. Once all of the 16-byte text data blocks for a particular execution thread are processed in the main processing loop 210, the accumulated results for that thread are sent from the accumulator 216 to the final processing stage 220. To ensure that the results in the final processing stage 220 are kept to a certain length (130-bit), a second modulo reduction operation 222 using a modulus value is applied to the contents of the accumulator 216.

In some embodiment, a key portion (e.g., k1 or k2) of the shared key is added to the results of the second modulo reduction operation 222 via adder 224. As noted, the key portion of the shared key represents a 128-bit integer that is used to produce a string 226 of a certain length (128-bit) for final tag 228 to transmit with an encoded message to a receiver client device. In some embodiments, the processing system 100 may use the third multiplexer 206 of circuit 200 to select, in alternating sequence, first key value k1 from a shared key that is associated with the one execution thread, such as thread 201, or second key value k2 from a shared key that is associated the other execution thread, such as thread 202.

In one clock cycle, results 226 are used to generate the final tag 228 for the message. In a next clock cycle, the processing system 100 executes the final processing stage 220 of the circuit 200 for the subsequent execution thread to produce a second authorization tag for that thread.

Figure 3:
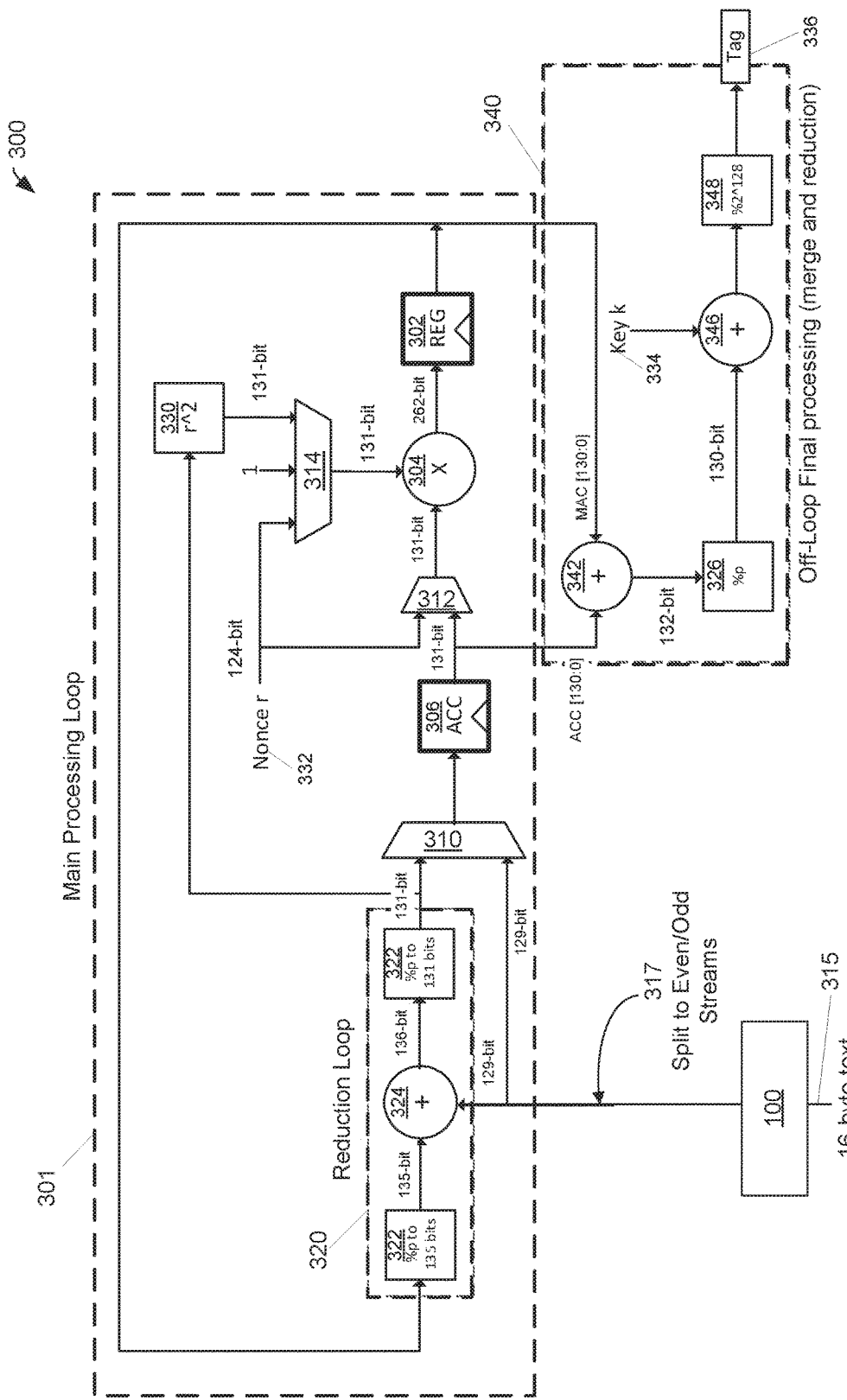
FIG. 3 illustrates a circuit to support parallelized authentication encoding with the processing system of FIG. 1 according to an embodiment of the disclosure.

FIG. 3 illustrates a circuit 300 to support parallelized authentication encoding with the processing system 100 of FIG. 1 according to an embodiment of the disclosure. Circuit 300 can operate as described in connection with the message authentication system 140 and can generate authentication tags for the messages transmitted by processing system 100 to ensure the authenticity of the messages to a receiver device. Advantageously, the circuit 300 provides a highly efficient single threaded implementation of the parallelized encoding logic 150 which can rapidly obtain results for the authentication encoding tags in manner to fully utilize the hardware components disposed therein.

In one embodiment, the circuit 300 includes a man processing loop 301 comprising several hardware components that include a pipeline stage 302 coupled to a multiplier 304, an accumulator 306, a first multiplexer 310, a second multiplexer 312, a third multiplexer 314 and a reduction loop 320 comprising a first adder 324. As shown, the circuit 300 also includes a final processing stage 340 that in one implementation includes a second adder 342 and a third adder 346.

In this example, the circuit 300 is designed to provide parallelism in the cryptographic computations needed to create the authentication encoding tag 336 of a single input message by splitting an input text stream 315 by splitting an input text stream 315 associated with the message into two streams 317, such as odd-numbered first text data stream and an even-numbered second text data stream, and processing them separately. The split text data streams are processed in at least partially in parallel by using the pipeline hardware of the circuit 300. For example, portions of the circuit 300 may be used, overlapping in time, to generate an authentication tag 336 for the single input message.

The cryptographic computation needed to generate the authentication encoding tag 336 comprises a multiplication of 16-bytes of a text by a nonce r 332 and an accumulation of the results. Because the input text stream 315 is split into two streams 317, the streams are multiplied by nonce value squared 330 to compensate for a missed multiplication from the other stream. For example, each of the two input text streams 317 misses the addition of the text blocks from each other, and the corresponding multiplication by nonce r 332. As noted, the nonce value r 332 is derived from a secret key, which is stored in the key store 148 associated with processing system 100.

In operation, when the processing system 100 passes 16-bytes of input text data from one of the two streams 317 to the man processing loop 301, it goes to the accumulator 306. Contents of the accumulator 306 are multiplied by a squared nonce value 330 (e.g., a prime number$^2$). The results are then stored in the pipeline stage 302. This set of operations is repeated for each of the two streams 317. Contents of the register are passed to the reduction loop 320 of the circuit 300 to apply a modulo reduction operation 322 to the contents using a modulus value (e.g., a prime number). As noted, the missed nonce r multiplication is compensated for by multiplying the two streams by nonce r squared 330 at each iteration of the main loop 301. Because of the multiplication by nonce r squared 330, the main loop 301 of FIG. 3 can longer keep data in 130 bits. Therefore, the modulo reduction operation 326 in the final processing stage 340 of circuit 300 must do more than the final modulo reduction operation 222 in circuit 200 of FIG. 2.

After passing through the reduction loop 320, data is sent to the accumulator 306 to accumulate results used to produce a first portion of an authentication tag to associate with the message. Before completion of the results for the first portion, the processing system 100 passes 16-bytes of input text data from the other one of the two streams 317. Thereafter, the processing system 100 starts production of a second portion of the authentication tag associated with the other stream. The portions of the split text data will then be merged at the end of the main processing loop 301 by merging the results together in the final processing stage 340 via adder 342.

In the final processing stage 340 of circuit 300, a second modulo reduction operation 326 is applied to the merged results using the modulus value. The second modulo reduction operation 326 ensures that the results are kept to a certain length (e.g., 130-bits). At this point, results second modulo reduction operation 326 are combined with a key portion 334 of a secret key via the third adder 346. As noted, the key 334 may represent a 128-bit integer that is used to generate a string 348 of a determined length for the final tag 336. This final tag 336 is used to authenticate the input text stream 315 when the message associated with the stream 315 is transmitted to a receiver device.

Figure 4:
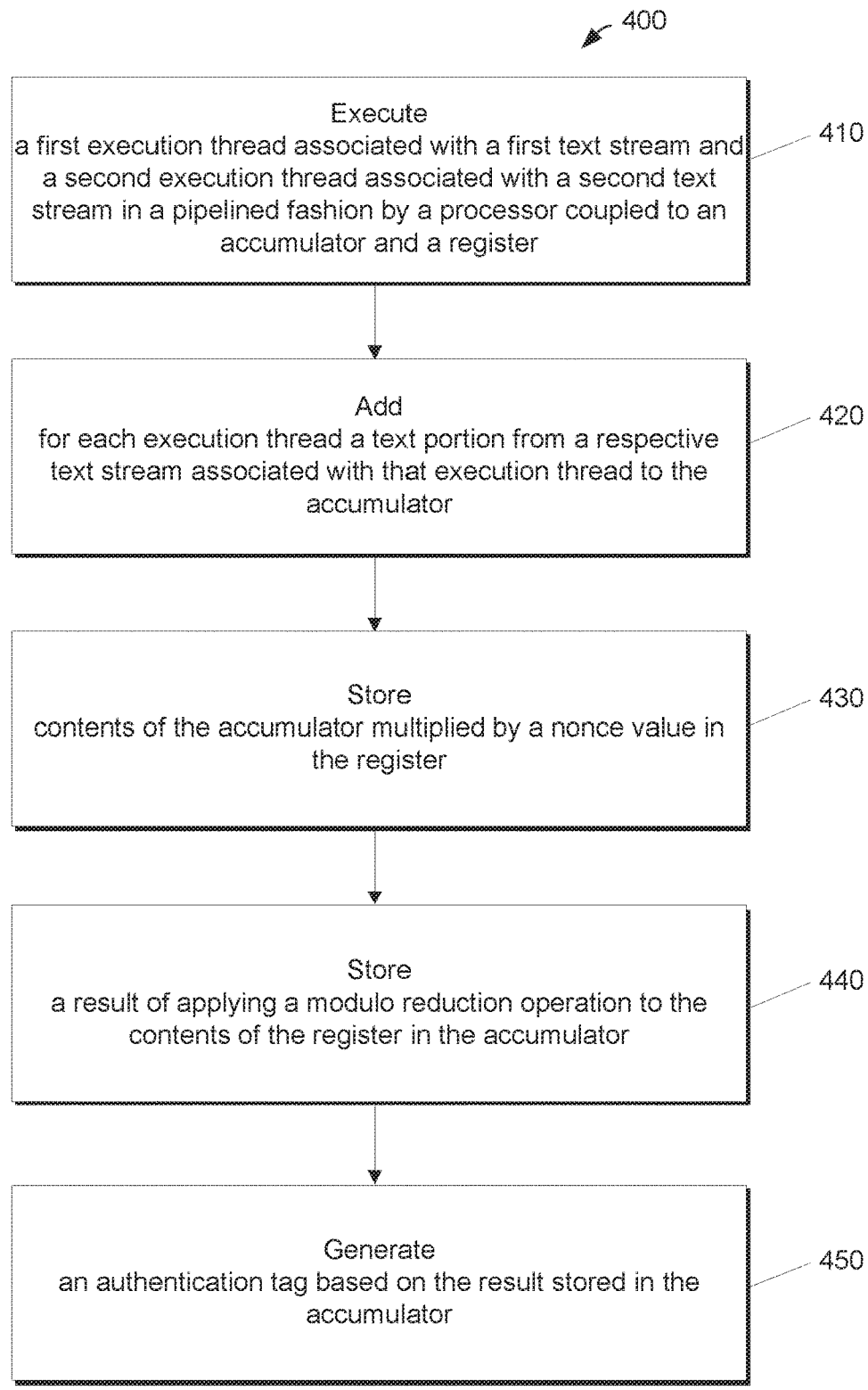
FIG. 4 illustrates a flow diagram of a method for a double threaded parallelized authentication encoding according to one embodiment.

FIG. 4 illustrates a flow diagram of a method 400 for a double threaded parallelized authentication encoding according to one embodiment. Method 400 may be performed by processing logic that may comprise hardware (e.g., circuitry, dedicated logic, programmable logic, microcode, etc.), software (such as instructions run on a processing device), firmware, or a combination thereof. In one embodiment, the processing system 100 in FIG. 1 as direct by the parallelized encoding logic 150 may perform method 400. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 400 begins at block 410 where a first execution thread associated with a first text stream and a second execution thread associated with a second text stream are executed in a pipelined fashion by a processor coupled to an accumulator and a register. In block 420, for each execution thread, a text portion from a respective text stream associated with that execution thread is added to the accumulator. Contents of the accumulator multiplied by a nonce value are stored in the register in block 430. A modulo reduction operation is applied to the contents of the register in block 440. Thereupon, a result of the operation is stored in the accumulator. In block 450, an authentication tag is generated based on the result stored in the accumulator.

Figure 5:
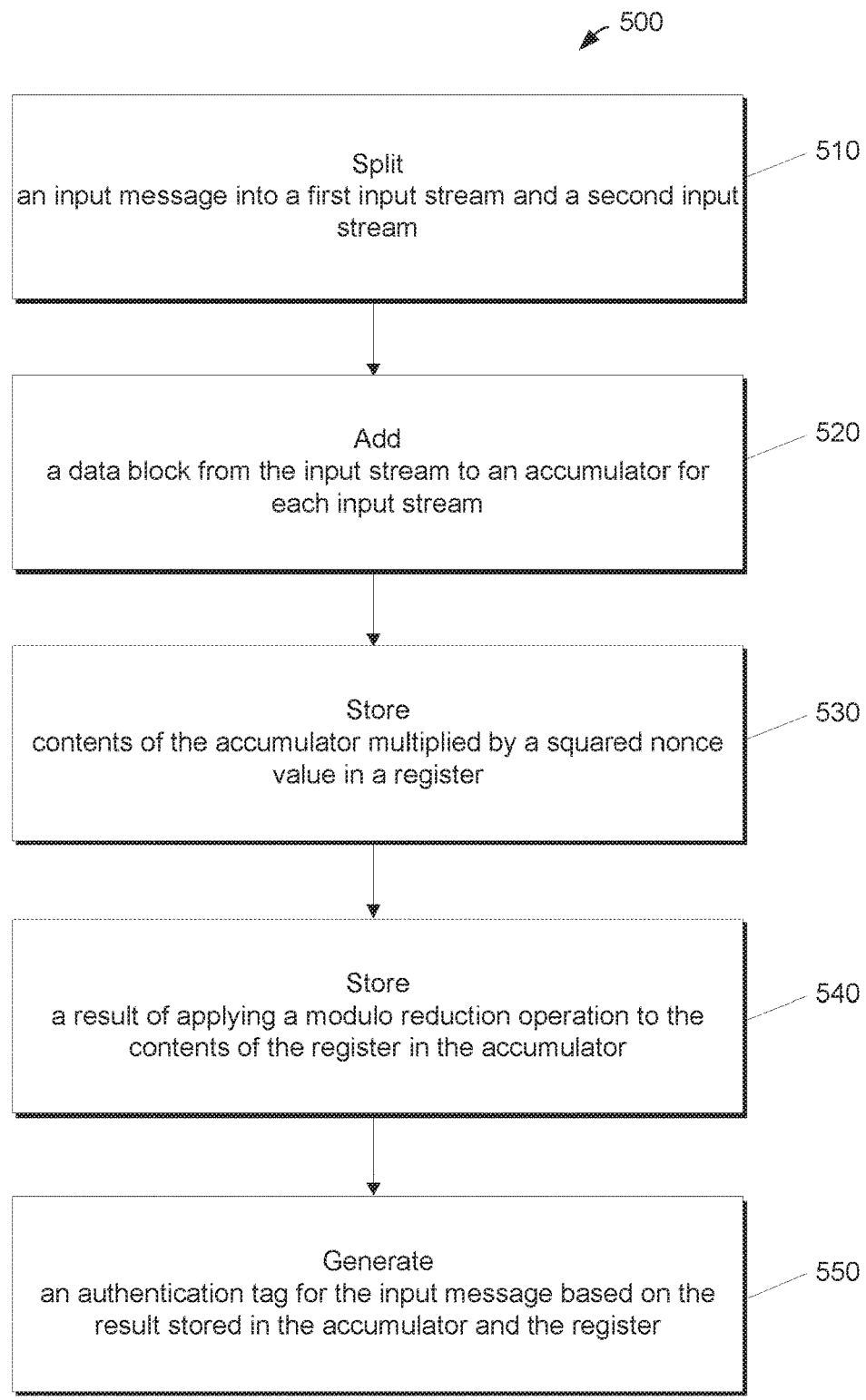
FIG. 5 illustrates another flow diagram of a method for a single threaded parallelized authentication encoding according to one embodiment.

FIG. 5 illustrates another flow diagram of a method for a single threaded parallelized authentication encoding according to one embodiment. Method 500 may be performed by processing logic that may comprise hardware (e.g., circuitry, dedicated logic, programmable logic, microcode, etc.), software (such as instructions run on a processing device), firmware, or a combination thereof. In one embodiment, the processing system 100 in FIG. 1 as direct by the parallelized encoding logic 150 may perform method 500. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 500 begins at block 510 where an input message is split into a first input stream and a second input stream. In block 520, a data block from the input stream is added to an accumulator for each input stream. Contents of the accumulator multiplied by a squared nonce value are stored in a register in block 530. A modulo reduction operation is applied to the contents of the register in block 540. Thereupon, the result is stored in the accumulator. In block 550, an authentication tag for the input message is generated based on the result stored in the accumulator and the contents in the register.

FIG. 6A is a block diagram illustrating a micro-architecture for a processor 600 that implements techniques for parallelized authentication encoding in accordance with one embodiment of the disclosure. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

Figure 6:
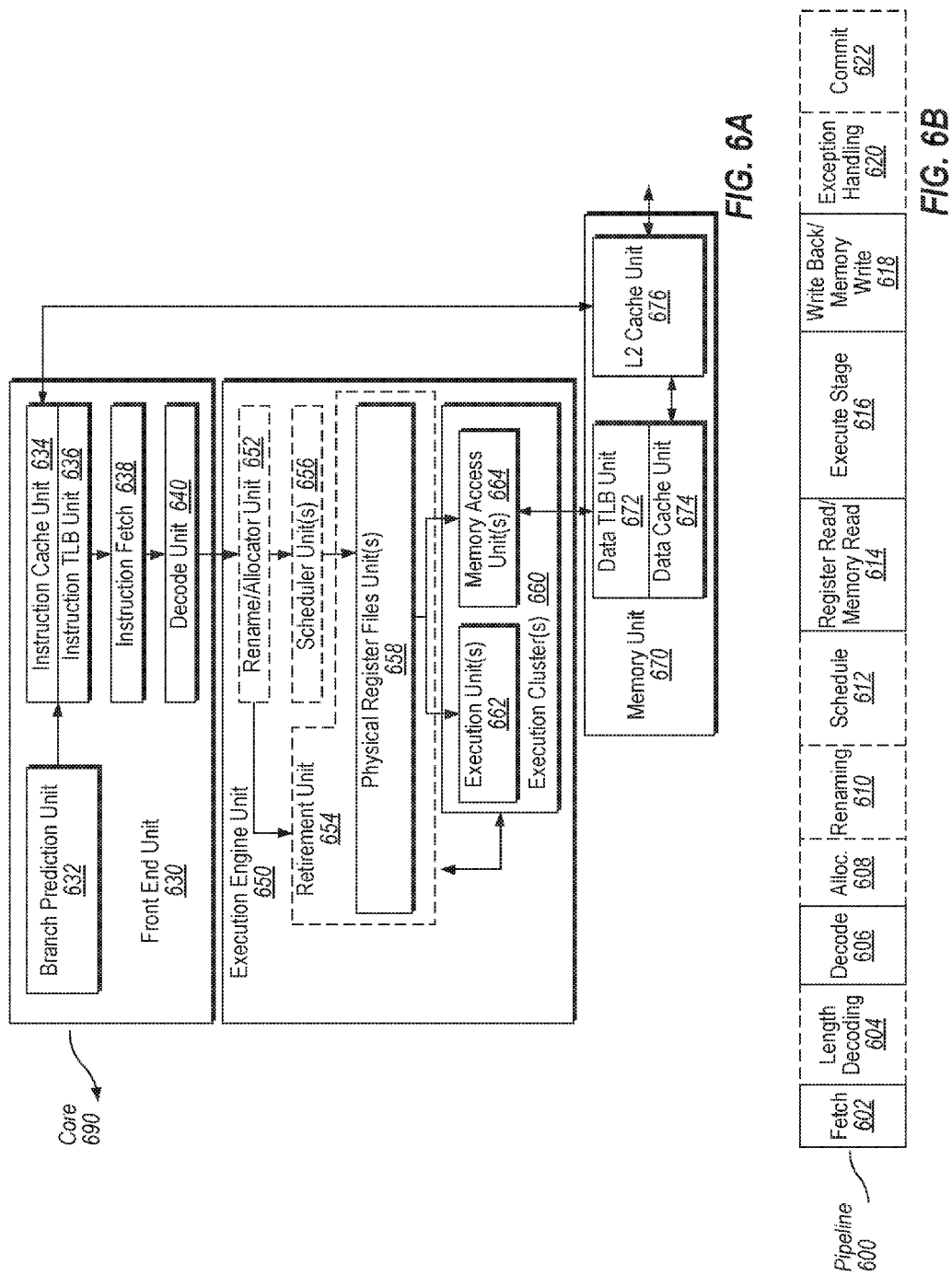
FIG. 6A is a block diagram illustrating a micro-architecture for a processor according to one embodiment.
FIG. 6B is a block diagram illustrating an in-order pipeline and a register renaming stage, out-of-order issue/execution pipeline according to one embodiment.

In one implementation, processor 600 may be the same as processing system 100 described with respect to FIG. 6 to support parallelized authentication encoding in a processing device described with respect to implementations of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
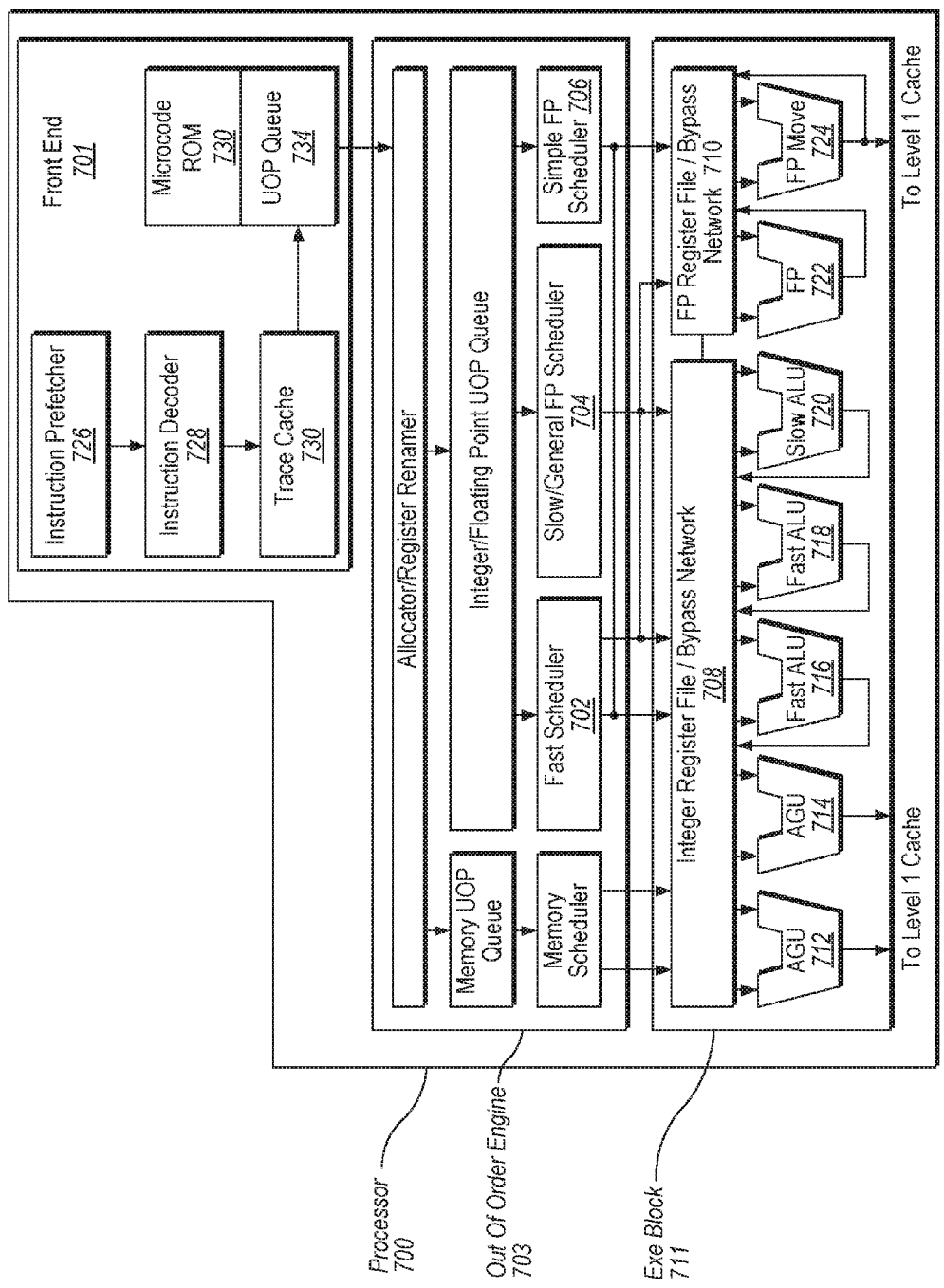
FIG. 7 is a block diagram illustrating a computer system according to one implementation.

FIG. 7 illustrates a block diagram of the micro-architecture for a processor 700 that includes logic circuits to implement techniques for parallelized authentication encoding in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement store address prediction for memory disambiguation according to embodiments of the disclosure. In one embodiment, the execution block 711 of processor 700 may include a store address predictor (not shown) for implementing techniques for parallelized authentication encoding in accordance with one embodiment of the disclosure.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
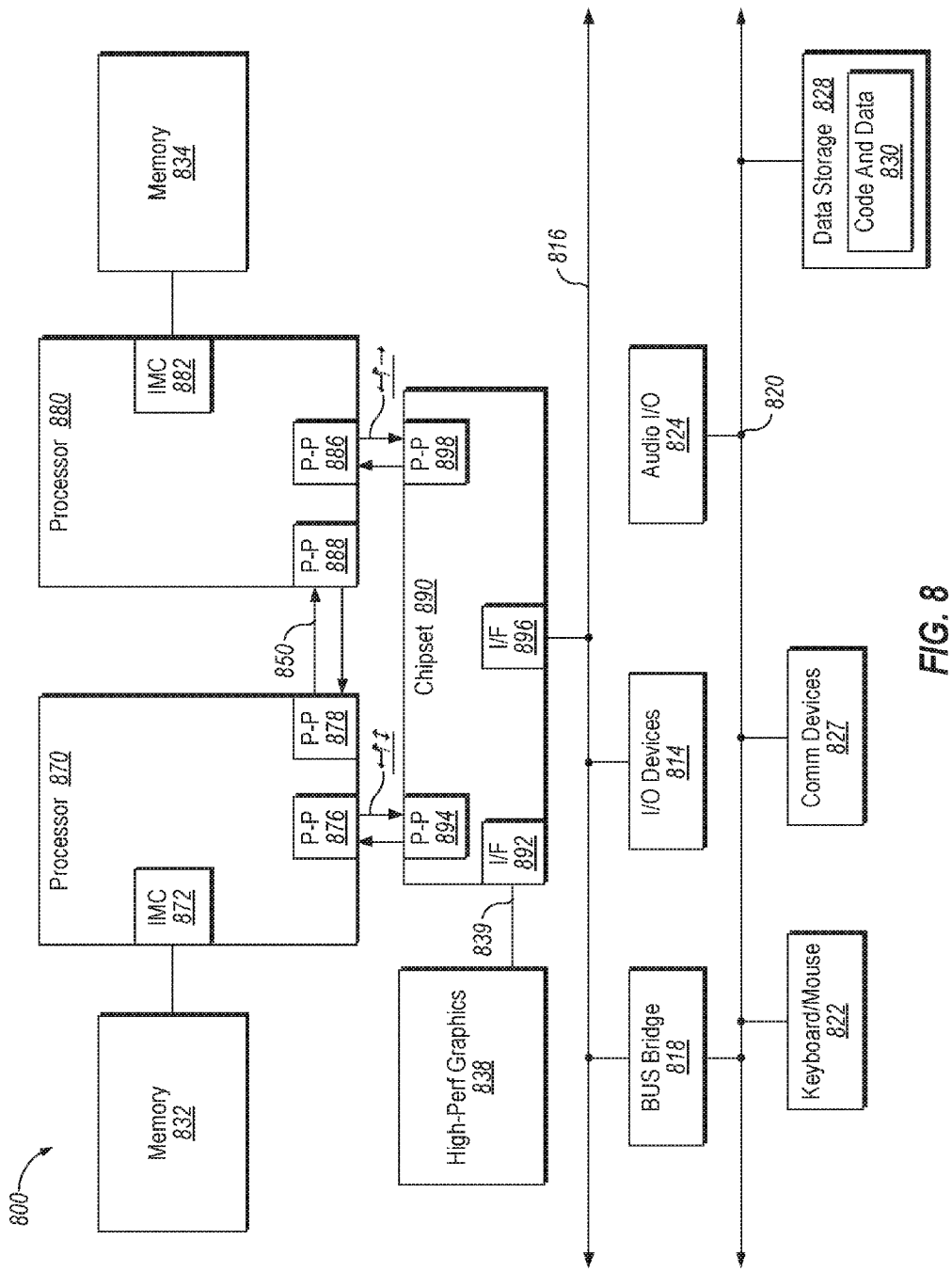
FIG. 8 is a block diagram illustrating a system in which an embodiment of the disclosure may be used.

Embodiments may be implemented in many different system types. Referring now to FIG. 8, shown is a block diagram illustrating a system 800 in which an embodiment of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may implement techniques for parallelized authentication encoding as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset

890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
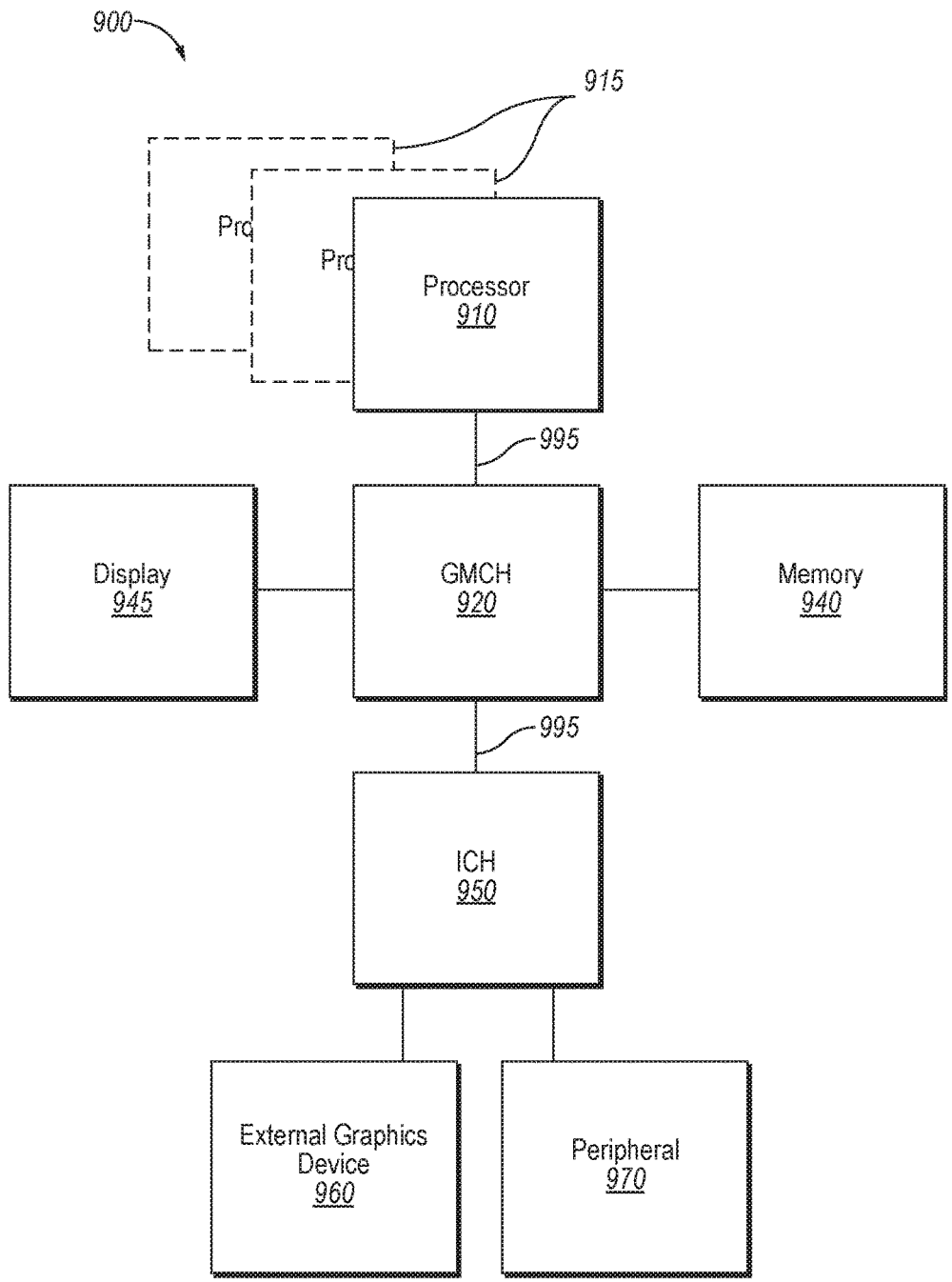
FIG. 9 is a block diagram illustrating a system in which an embodiment of the disclosure may be used.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 support parallelized authentication encoding according to embodiments of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a frontside bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the embodiment of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
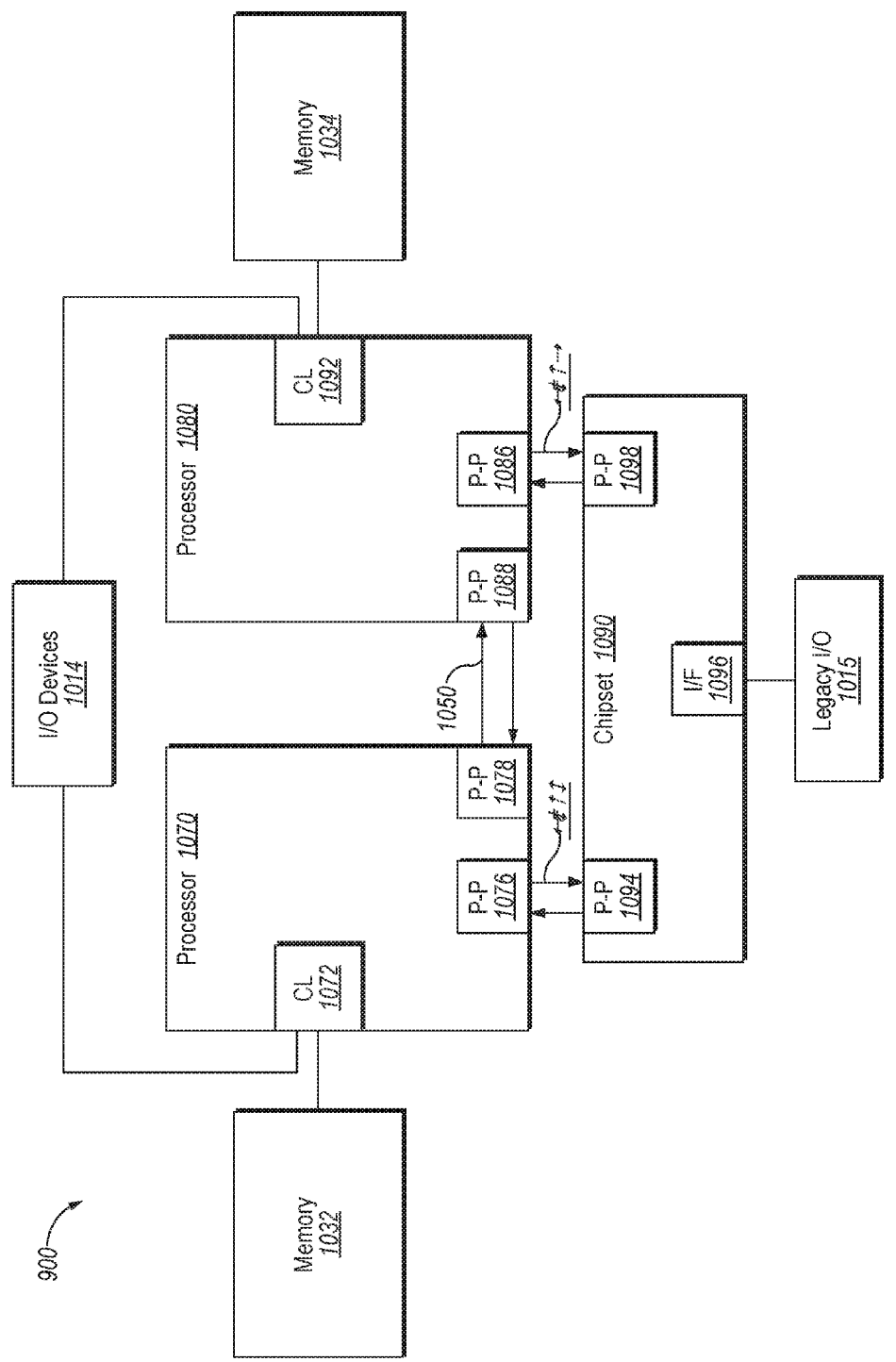
FIG. 10 is a block diagram illustrating a system in which an embodiment of the disclosure may be used.

Referring now to FIG. 10, shown is a block diagram of a system 1000 in which an embodiment of the disclosure may operate. FIG. 10 illustrates processors 1070, 1080. In one embodiment, processors 1070, 1080 may support parallelized authentication encoding as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
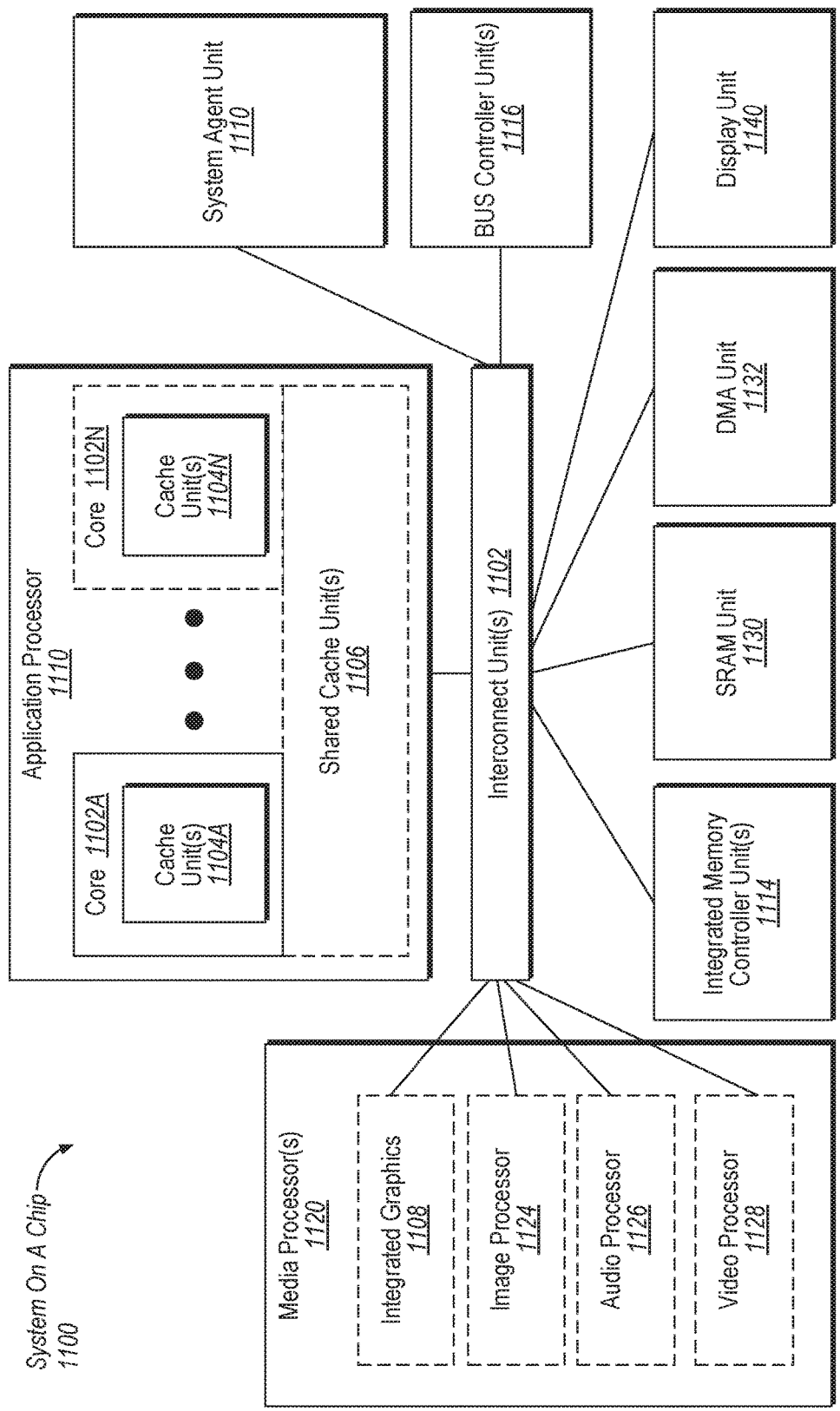
FIG. 11 is a block diagram illustrating a System-on-a-Chip (SoC) in which an embodiment of the disclosure may be used.

Embodiments may be implemented in many different system types. FIG. 11 is a block diagram of a SoC 1100 in accordance with an embodiment of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set or one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The application processor 1120 may include a PMU for implementing silent memory instructions and miss-rate tracking to optimize switching policy on threads as described in embodiments herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
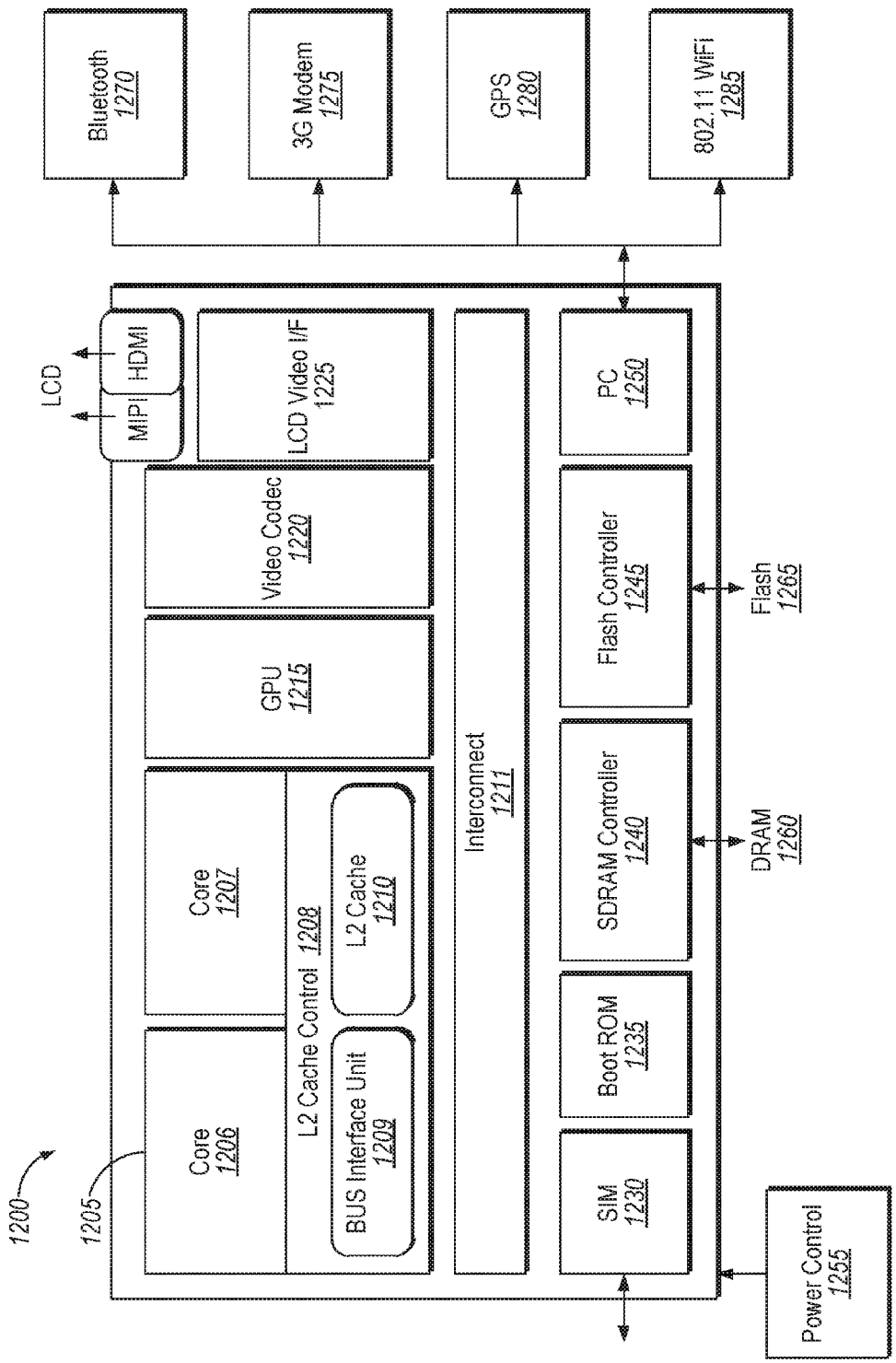
FIG. 12 is a block diagram illustrating a SoC design in which an embodiment of the disclosure may be used.

FIG. 12 is a block diagram of an embodiment of a system on-chip (SoC) design in accordance with the disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one embodiment, cores 1206, 1207 may support parallelized authentication encoding as described in embodiments herein.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
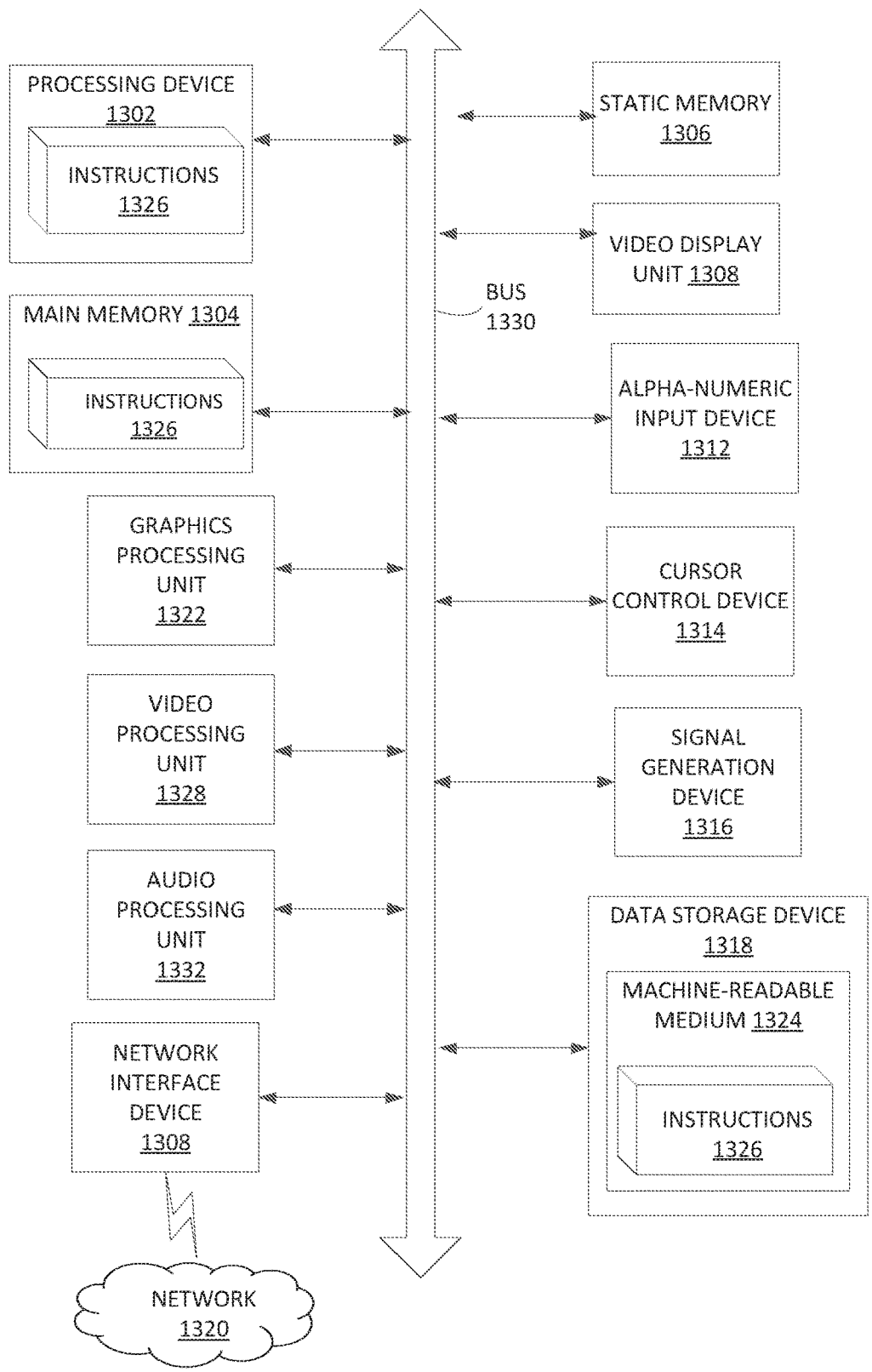
FIG. 13 illustrates a block diagram illustrating a computer system in which an embodiment of the disclosure may be used.

FIG. 13 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processing cores. The processing device 1302 is configured to execute the processing logic 1326 for performing the operations and steps discussed herein. In one embodiment, processing device 1302 is the same as processor architecture 100 described with respect to FIG. 1 that implement techniques for supporting parallelized authentication encoding as described herein with embodiments of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics processing unit 1322, a video processing unit 1328, and an audio processing unit 1332.

The data storage device 1318 may include a machine-accessible storage medium 1324 on which is stored software 1326 implementing any one or more of the methodologies of functions described herein, such as implementing silent memory instructions and miss-rate tracking to optimize switching policy on threads in a processing device as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media.

The machine-readable storage medium 1324 may also be used to store instructions 1326 implementing silent memory instructions and miss-rate tracking to optimize switching policy on threads in a processing device such as described with respect to processing system 100 in FIG. 1, and/or a software library containing methods that call the above applications. While the machine-accessible storage medium 1328 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 is a processing system comprising: 1) an accumulator; 2) a register representing a pipeline stage; and 3) a processing core coupled to the accumulator and to the register. The processing core to execute, in a pipelined fashion, a first execution thread associated with a first text stream and a second execution thread associated with a second text stream, wherein each execution thread is to: a) add, to the accumulator, a text portion from a respective text stream associated with the execution thread; b) store, in the register, contents of the accumulator multiplied by a nonce value; c) store, in the accumulator, a result of applying a modulo reduction operation to the contents of the register; and d) generate an authentication tag based on the result stored in the accumulator.

In Example 2, the subject matter of Example 1, wherein to generate the authentication tag, the processing core is further to apply a second modulo reduction operation to the results stored in the accumulator.

In Example 3, the subject matter of Examples 1-2, wherein the processing core is further to: a) derive a key value from a shared key associated with the processing system; and b) add the key value to results of the second modulo reduction operation.

In Example 4, the subject matter of Examples 1-3, wherein to derive the key value from the shared key, the processing core is further to: a) associate a first key value from the shared key with the first execution thread; and b) associate a second key value from the shared key with the second execution thread.

In Example 5, the subject matter of Examples 1-4, wherein the processing core is further to transmit the authentication tag to a receiver device.

Various embodiments may have different combinations of the structural features described above. For instance, all optional features of the processor described above may also be implemented with respect to a method or process described herein and specifics in the examples may be used anywhere in one or more embodiments.

Example 6 is a method, comprising: 1) executing, by a processor coupled to an accumulator and a register, a first execution thread associated with a first text stream and a second execution thread associated with a second text stream in a pipelined fashion; wherein executing each execution thread comprises: 2) adding, to the accumulator, a text portion from a respective text stream associated with the execution thread; 3) storing, in the register, contents of the accumulator multiplied by a nonce value; 4) storing, in the accumulator, a result of applying a modulo reduction operation to the contents of the register; and 5) generating an authentication tag based on the result stored in the accumulator.

In Example 7, the subject matter of Example 6, wherein generating the authentication tag further comprises applying a second modulo reduction operation to the results stored in the accumulator.

In Example 8, the subject matter of Examples 6-7, further comprising a) deriving a key value from a shared key associated with the processor; and b) adding the key value to results of the second modulo reduction operation.

In Example 9, the subject matter of Examples 6-8, wherein deriving the key value from the shared key comprises: 1) associating a first key value from the shared key with the first execution thread; and 2) associating a second key value from the shared key with the second execution thread.

In Example 10, the subject matter of Examples 6-9, further comprising transmitting the authentication tag to a receiver device.

Various embodiments may have different combinations of the structural features described above. For instance, all optional features of the processors and methods described above may also be implemented with respect to a system on chip described herein and specifics in the examples may be used anywhere in one or more embodiments.

Example 11 is a system on chip (SoC), comprising: 1) an accumulator; 2) a register representing a pipeline stage; and 3) a processor coupled to the accumulator and to the register, the processor to execute, in a pipelined fashion, a first execution thread associated with a first text stream and a second execution thread associated with a second text stream, wherein each execution thread is to: 4) add, to the accumulator, a text portion from a respective text stream associated with the execution thread; 5) store, in the register, contents of the accumulator multiplied by a nonce value; 6) store, in the accumulator, a result of applying a modulo reduction operation to the contents of the register; and 7) generate an authentication tag based on the result stored in the accumulator.

In Example 12, the subject matter of Example 11, wherein to generate the authentication tag, the processor is further to apply a second modulo reduction operation to the results stored in the accumulator.

In Example 13, the subject matter of Examples 11-12, wherein the processor is further to: a) derive a key value from a shared key associated with the SoC; and b) add the key value to results of the second modulo reduction operation.

In Example 14, the subject matter of Examples 11-13, wherein to derive the key value from the shared key, the processor is further to: a) associate a first key value from the shared key with the first execution thread; and b) associate a second key value from the shared key with the second execution thread.

In Example 15, the subject matter of Examples 11-14, wherein the processor is further to transmit the authentication tag to a receiver device.

Various embodiments may have different combinations of the operational features described above. For instance, all optional features of the methods described above may also be implemented with respect to a non-transitory, computer-readable storage medium. Specifics in the examples may be used anywhere in one or more embodiments Example 16 is a non-transitory computer readable storage medium storing executable instructions, that when executed by a processing device, cause the processing device to: 1) execute, by the processing device, a first execution thread associated with a first text stream and a second execution thread associated with a second text stream in a pipelined fashion; wherein to execute each execution thread the processing device to: 2) add, to an accumulator, a text portion from a respective text stream associated with the execution thread; 3) store, in a register representing a pipeline stage, contents of the accumulator multiplied by a nonce value; 4) store, in the accumulator, a result of applying a modulo reduction operation to the contents of the register; and 5) generate an authentication tag based on the result stored in the accumulator.

In Example 17, the subject matter of Example 16, wherein to generate the authentication tag, the processing device further to apply a second modulo reduction operation to the results stored in the accumulator.

In Example 18, the subject matter of Examples 16-17, wherein the processing device further to: a) derive a key value from a shared key associated with the processor; and b) add the key value to results of the second modulo reduction operation.

In Example 19, the subject matter of Examples 16-18, wherein to derive the key value from the shared key, the processing device further to: a) associate a first key value from the shared key with the first execution thread; and b) associate a second key value from the shared key with the second execution thread.

In Example 20, the subject matter of Examples 16-19, wherein the processing device further to transmit the authentication tag to a receiver device.

Example 21 is a non-transitory, computer-readable storage medium including instructions that, when executed by a processor, cause the processor to perform the method of claims 6-10.

Various embodiments may have different combinations of the operational features described above. For instance, all optional features of the methods, systems and non-transitory, computer-readable storage mediums described above may also be implemented with respect to other type of structures. Specifics in the examples may be used anywhere in one or more embodiments.

Example 22 is an apparatus comprising: 1) a plurality of functional units of a processor; 2) means for executing a first execution thread associated with a first text stream and a second execution thread associated with a second text stream in a pipelined fashion; wherein executing each execution thread comprises: 3) means for adding, to an accumulator, a text portion from a respective text stream associated with the execution thread; 4) means for storing, in a register, contents of the accumulator multiplied by a nonce value; 5) means for storing, in the accumulator, a result of applying a modulo reduction operation to the contents of the register; and 6) means for generating an authentication tag based on the result stored in the accumulator.

In Example 23, the subject matter of Example 21, further comprising the subject matter of any of claims 1-5 and 11-15.

Example 24 is a system comprising: a memory device and a processor comprising a memory controller unit, wherein the processor is configured to perform the method of any of claims 6-10.

In Example 25, the subject matter of Example 24, further comprising the subject matter of any of claims 1-5 and 11-15.

Example 26 is a processing system comprising: 1) an accumulator; 2) a register representing a pipeline stage; and 3) a processing core coupled to the accumulator and to the register, the processing core to: 4) split an input message into a first input stream and a second input stream, wherein the processing core is further to, for each input stream: 5) add, to the accumulator, a data block from the input stream, 6) store, in the register, contents of the accumulator multiplied by a squared nonce value, and 7) store, in the accumulator, a result of applying a modulo reduction operation to the contents of the register; and 8) generate an authentication tag for the input message based on the result stored in the accumulator and the register.

In Example 27, the subject matter of Example 26, wherein the processing core is further to merge the result associated with each input stream together.

In Example 28, the subject matter of Examples 27, wherein the processing core is further to applying a second modulo reduction operation to the merged result.

In Example 29, the subject matter of Examples 28, wherein to generate the authentication tag, the processing core is further to: a) derive a key value from a shared key associated with the processing system; and b) add the key value results of the second modulo reduction operation.

In Example 30, the subject matter of Examples 29, wherein the processing core is further to transmit the authentication tag to a receiver device.

Various embodiments may have different combinations of the structural features described above. For instance, all optional features of the processor described above may also be implemented with respect to a method or process described herein and specifics in the examples may be used anywhere in one or more embodiments.

Example 31 is a method, comprising: 1) splitting, by a processing device coupled to an accumulator and a register representing a pipeline stage, an input message into a first input stream and a second input stream, wherein for each input stream: 2) adding, to the accumulator, a data block from the input stream, 3) storing, in the register, contents of the accumulator multiplied by a squared nonce value, and 4) storing, in the accumulator, a result of applying a modulo reduction operation to the contents of the register; and 5) generating, by the processing device, an authentication tag for the input message based on the result stored in the accumulator and the register.

In Example 32, the subject matter of Example 31, furthering comprising merging the result associated with each input stream together.

In Example 33, the subject matter of Examples 31-32, furthering comprising applying a second modulo reduction operation to the merged result.

In Example 34, the subject matter of Examples 31-33, wherein generating the authentication tag further comprises: a) deriving a key value from a shared key associated with the processing system; and b) adding the key value results of the second modulo reduction operation.

In Example 35, the subject matter of Examples 31-34, further comprising transmitting the authentication tag to a receiver device.

Various embodiments may have different combinations of the structural features described above. For instance, all optional features of the processors and methods described above may also be implemented with respect to a system on chip described herein and specifics in the examples may be used anywhere in one or more embodiments.

Example 36 is a system on chip (SoC), comprising: 1) an accumulator; 2) a register representing a pipeline stage; and 3) a processor coupled to the accumulator and to the register, the processor to: 4) split an input message into a first input stream and a second input stream, wherein the processor is further to, for each input stream: 5) add, to the accumulator, a data block from the input stream, 6) store, in the register, contents of the accumulator multiplied by a squared nonce value, and 7) store, in the accumulator, a result of applying a modulo reduction operation to the contents of the register; and 7) generate an authentication tag for the input message based on the result stored in the accumulator and the register.

In Example 37, the subject matter of Example 36, wherein the processor is further to merge the result associated with each input stream together.

In Example 38, the subject matter of Examples 36-37, wherein the processor is further to applying a second modulo reduction operation to the merged result.

In Example 39, the subject matter of Examples 36-38, wherein to generate the authentication tag, the processor is further to: a) derive a key value from a shared key associated with the processing system; and b) add the key value results of the second modulo reduction operation.

In Example 40, the subject matter of Examples 36-39, wherein the processor is further to transmit the authentication tag to a receiver device.

Various embodiments may have different combinations of the operational features described above. For instance, all optional features of the methods described above may also be implemented with respect to a non-transitory, computer-readable storage medium. Specifics in the examples may be used anywhere in one or more embodiments.

Example 41 is a non-transitory computer readable storage medium storing executable instructions, that when executed by a processing device, cause the processing device to: 1) split, by the processing device, an input message into a first input stream and a second input stream, wherein for each input stream: 2) add, to an accumulator, a data block from the input stream, 3) store, in a register representing a pipeline stage, contents of the accumulator multiplied by a squared nonce value, and 4) store, in the accumulator, a result of applying a modulo reduction operation to the contents of the register; and 5) generate, by the processing device, an authentication tag for the input message based on the result stored in the accumulator and the register.

In Example 42, the subject matter of Example 41, wherein the processing device further to merge the result associated with each input stream together.

In Example 43, the subject matter of Examples 41-42, wherein the processing device further to apply a second modulo reduction operation to the merged result.

In Example 44, the subject matter of Examples 41-43, wherein to generate the authentication tag, the processing device further to: a) derive a key value from a shared key associated with the processing system; and b) add the key value results of the second modulo reduction operation.

In Example 45, the subject matter of Examples 41-44, wherein the processing device further to transmit the authentication tag to a receiver device.

Example 46 is a non-transitory, computer-readable storage medium including instructions that, when executed by a processor, cause the processor to perform the method of claims 31-35.

Various embodiments may have different combinations of the operational features described above. For instance, all optional features of the methods, systems and non-transitory, computer-readable storage mediums described above may also be implemented with respect to other type of structures. Specifics in the examples may be used anywhere in one or more embodiments.

Example 47 is an apparatus comprising: 1) a plurality of functional units of a processor; 2) means for splitting an input message into a first input stream and a second input stream, wherein for each input stream: 3) means for adding, to an accumulator, a data block from the input stream, 4) means for storing, in a register representing a pipeline stage, contents of the accumulator multiplied by a squared nonce value, and 5) means for storing, in the accumulator, a result of applying a modulo reduction operation to the contents of the register; and 6) means for generating an authentication tag for the input message based on the result stored in the accumulator and the register.

In Example 48, the subject matter of Example 47, further comprising the subject matter of any of claims 26-30 and 36-40.

Example 49 is a system comprising a memory device and a processor comprising a memory controller unit, wherein the processor is configured to perform the method of any of claims 31-35.

In Example 50, the subject matter of Example 49, further comprising the subject matter of any of claims 26-30 and 36-40.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing system comprising:
an accumulator;
a register representing a pipeline stage; and
a processing core coupled to the accumulator and to the register, the processing core to:
split an input message into a first input stream and a second input stream, wherein the processing core is further to, for each input stream in parallel:
add, to the accumulator, a data block from the input stream,
store, in the register, contents of the accumulator multiplied by a squared nonce value, and
store, in the accumulator, a result of applying a modulo reduction operation to the contents of the register; and
generate an authentication tag for the input message based on the result stored in the accumulator and the contents in the register.

2. The processing system of claim 1, wherein the processing core is further to merge the result associated with each input stream together.

3. The processing system of claim 2, wherein the processing core is further to applying a second modulo reduction operation to the merged result.

4. The processing system of claim 1, wherein to generate the authentication tag, the processing core is further to:
derive a key value from a shared key associated with the processing system; and
add the key value results of the second modulo reduction operation.

5. The processing system of claim 1, wherein the processing core is further to transmit the authentication tag to a receiver device.

6. A method, comprising:
splitting, by a processing device coupled to an accumulator and a register representing a pipeline stage, an input message into a first input stream and a second input stream, wherein for each input stream in parallel:
adding, to the accumulator, a data block from the input stream,
storing, in the register, contents of the accumulator multiplied by a squared nonce value, and
storing, in the accumulator, a result of applying a modulo reduction operation to the contents of the register; and
generating, by the processing device, an authentication tag for the input message based on the result stored in the accumulator and the contents in the register.

7. The method of claim 6, furthering comprising merging the result associated with each input stream together.

8. The method of claim 7, furthering comprising applying a second modulo reduction operation to the merged result.

9. The method of claim 6, wherein generating the authentication tag further comprises:
deriving a key value from a shared key associated with the processing system; and
adding the key value results of the second modulo reduction operation.

10. The method of claim 6, further comprising transmitting the authentication tag to a receiver device.

11. A system on chip (SoC), comprising:
an accumulator;
a register representing a pipeline stage; and
a processor coupled to the accumulator and to the register, the processor to:
split an input message into a first input stream and a second input stream, wherein the processor is further to, for each input stream in parallel:
add, to the accumulator, a data block from the input stream,
store, in the register, contents of the accumulator multiplied by a squared nonce value, and
store, in the accumulator, a result of applying a modulo reduction operation to the contents of the register; and
generate an authentication tag for the input message based on the result stored in the accumulator and the contents in the register.

12. The SoC of claim 11, wherein the processor is further to merge the result associated with each input stream together.

13. The SoC of claim 12, wherein the processor is further to applying a second modulo reduction operation to the merged result.

14. The SoC of claim 11, wherein to generate the authentication tag, the processor is further to:
derive a key value from a shared key associated with the processing system; and
add the key value results of the second modulo reduction operation.

15. The SoC of claim 11, wherein the processor is further to transmit the authentication tag to a receiver device.

16. A processing system, comprising:
an accumulator;
a register representing a pipeline stage; and
a processing core coupled to the accumulator and to the register, the processing core to execute, in a pipelined fashion, a first execution thread associated with a first text stream and a second execution thread associated with a second text stream, wherein each execution thread in parallel is to:
add, to the accumulator, a text portion from a respective text stream associated with the execution thread;
store, in the register, contents of the accumulator multiplied by a nonce value;
store, in the accumulator, a result of applying a modulo reduction operation to the contents of the register; and
generate an authentication tag based on the result stored in the accumulator.

17. The processing system of claim 16, wherein to generate the authentication tag, the processing core is further to apply a second modulo reduction operation to the results stored in the accumulator.

18. The processing system of claim 17, wherein the processing core is further to:
derive a key value from a shared key associated with the processing system; and
add the key value to results of the second modulo reduction operation.

19. The processing system of claim 18, wherein to derive the key value from the shared key, the processing core is further to:

associate a first key value from the shared key with the first execution thread; and associate a second key value from the shared key with the second execution thread.

20. The processing system of claim 16, wherein the processing core is further to transmit the authentication tag to a receiver device.

* * * * *